United States Patent [19]
Chowdhury et al.

[11] Patent Number: 5,524,388
[45] Date of Patent: Jun. 11, 1996

[54] AUTOMOTIVE WINDOW STABILITY ASSEMBLY

[75] Inventors: Dipak R. Chowdhury, Northville; Craig T. Stevens, Metamora, both of Mich.

[73] Assignee: Ford Motor Company, Dearborn, Mich.

[21] Appl. No.: 488,889

[22] Filed: Jun. 9, 1995

[51] Int. Cl.$^6$ ............................................. E05F 11/38
[52] U.S. Cl. .................. 49/374; 49/377; 49/441
[58] Field of Search .................. 49/374, 377, 395, 49/376, 441, 440

[56] References Cited

U.S. PATENT DOCUMENTS

| | | |
|---|---|---|
| 1,635,570 | 7/1927 | Bailey . |
| 2,060,915 | 11/1936 | Westrope .................. 49/376 |
| 2,084,269 | 6/1937 | Reid .................. 49/441 |
| 2,210,612 | 8/1940 | Widman .................. 49/376 |
| 2,236,447 | 9/1937 | Roethel . |
| 2,236,451 | 9/1939 | Roethel . |
| 2,361,608 | 8/1941 | Doty . |
| 3,788,008 | 1/1974 | Yackiw et al. .................. 49/377 X |
| 4,107,898 | 8/1978 | Andrzejewski et al. . |
| 4,183,178 | 1/1980 | Kiefer et al. . |
| 4,420,906 | 12/1983 | Pickles . |
| 4,550,529 | 11/1985 | Drouillard . |
| 4,625,458 | 12/1986 | Okamoto . |
| 4,704,820 | 11/1987 | Kisanuki .................. 49/441 |
| 5,170,586 | 12/1992 | Ose et al. . |

FOREIGN PATENT DOCUMENTS

| | | |
|---|---|---|
| 1010912 | 4/1955 | France . |
| 234647 | 6/1925 | United Kingdom . |

*Primary Examiner*—Philip C. Kannan
*Attorney, Agent, or Firm*—David B. Kelley; Roger L. May

[57] ABSTRACT

An automotive vehicle door 10 having a window panel 22 movable to close and partially open a window opening 18 is stabilized against lateral movement when in a partially open position by a lower channel 28, mounted substantially below a beltline section 32 of the window opening 18, which has a narrowed width section 64 with sides 46 inwardly crimped along a longitudinal axis thereof for cooperating with a deformable glass run 66 mounted within the lower channel 28 to restrict inboard and outboard movement of the window panel 22. A sleeve 52 between the lower channel 28 and a middle channel 26 limits relative lateral movement therebetween, and a reinforced window seal 36 along the beltline section 32 of the door 10 provides further lateral support for the window panel 22 in the partially opened position.

12 Claims, 4 Drawing Sheets

AUTOMOTIVE WINDOW STABILITY ASSEMBLY

FIELD OF THE INVENTION

The present invention relates to vehicle door window assemblies and, in particular, to a window assembly providing lateral stability for the door window when in an opened position.

BACKGROUND OF THE INVENTION

An automotive vehicle door with a window movable between an open and closed position is typically mounted within a pair of glass guides and, in addition, has an upper glass seat, or guide, for receiving the window when in the uppermost, closed position. The glass guides direct the window when moving to an open position, that is, when removed from the upper glass guide from obstructing the window opening, either partially or completely. When completely unobstructing the window opening, the window panel is below a beltline portion of the door, normally the lowermost portion of the window opening adjacent the inner panel and outer panel of the vehicle door. In the completely opened position, the window panel is relatively unaffected by vehicle induced pressure variations inboard and outboard of the vehicle door since the window panel is enclosed therewithin. In the closed position, the edges of the window panel seat with and are stabilized by the rearward, forward, and upper window guide channels. Thus, despite vehicle motion induced pressure variations between the passenger compartment of the vehicle and the outwardly adjacent area of the window panel, as a result of differences in relative air speed therebetween, the window panel remains firmly in place so that vibration, and the concomitant noise, are significantly reduced.

In some vehicle doors, a forward or rearward edge of the window panel may completely disengage from a window guide when the window is partially opened, due to the shape of the window door frame. In such a position, vehicle motion may induce the window panel to vibrate, causing undesirable noise and potentially loosening the window panel, the glass guides, or both. Additionally, in some vehicles, it is desirable to limit the window panel from completely unobstructing the window opening, and the aforementioned problem cannot be remedied by lowering the window panel below the beltline.

SUMMARY OF THE INVENTION

In response to the aforementioned problems, the present invention provides lateral stability for a door window panel in an automotive vehicle door having a reciprocating window panel movable between a closed position obstructing a window opening and an open position to at least partially unobstruct the opening, a lower edge of the window opening defining a beltline section of the door. Stability is achieved by a window panel stability assembly comprising an upper channel mounted substantially above a beltline portion of the door, a middle channel joined to the upper channel proximate the beltline portion and connected to an inner panel of the door, and a lower channel mounted substantially below the beltline portion of the door. The lower channel has a constant width deformable glass run therein and at least one narrowed width section which inwardly deforms the walls of the glass run to restrict inboard and outboard movement of the window panel. Attachment means, preferably in the form of a flexible tongue member, on an upper section of the lower channel attaches the middle channel to the lower channel. Further window stability is accomplished by spacer means laterally disposed between the upper section of the lower channel and the middle channel to limit relative lateral movement therebetween. The window panel stability assembly preferably has a pair of wire reinforced seals in contact with the inner and outer surfaces of the window panel along the beltline section to provide further lateral stability when in the partially opened position.

Thus, an advantage of the present invention is a window assembly providing increased lateral support for a vehicle door window panel when in the partially opened position.

A feature of the present invention is a glass guide having a narrowed width section for pressing a glass run into closer engagement with an edge of the window panel sliding therein.

Another feature is a sleeve disposed between connecting channels of the window glass guide for stabilizing lateral movement therebetween.

Yet another feature of the present invention is a wire reinforced seal along the beltline section of the window opening.

BRIEF DESCRIPTION OF THE DRAWINGS

Other objects, features, and advantages of the window guide assembly of the present invention will be apparent to those skilled in the automotive body arts upon reading the following description with reference to the accompanying drawings in which.

DETAILED DESCRIPTION OF THE PREFERRED EMBODIMENT

Figure 1:
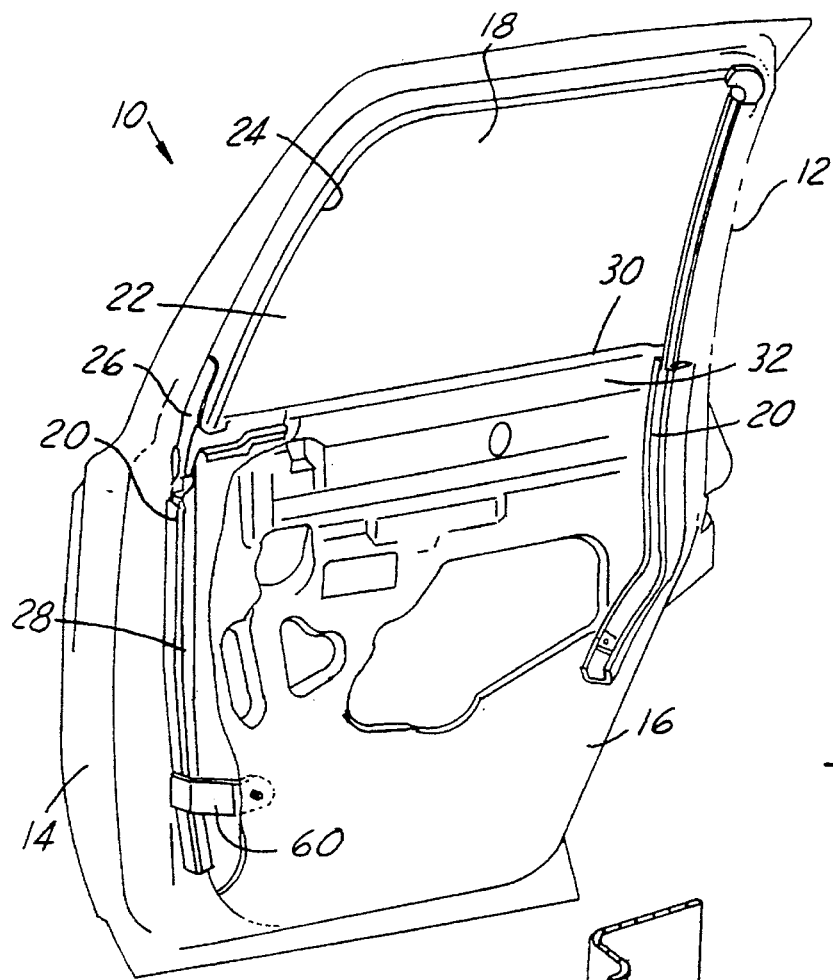
FIG. 1 is a perspective view of an automotive vehicle door 10 having a window opening and a door glass guide according to the present invention.
Figure 10:
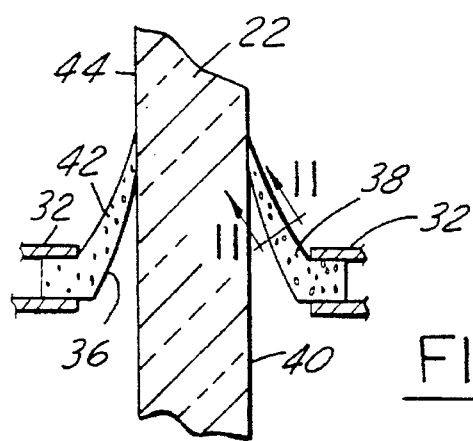
FIG. 10 is a cross-sectional view taken along line 10—10 of FIG. 8.

Turning now to the drawings, and in particular to FIG. 1 thereof, an automotive vehicle door 10 is shown having a door frame 12 comprising a door outer panel 14 and a door inner panel 16 defining a window opening 18. A pair of window glass guides 20 provide direction for a window panel 22 reciprocably movable between an open and closed position to alternately obstruct and unobstruct the window opening 18. The glass guides 20 are attached to the door frame 12, and preferably have an upper channel 24, a middle channel 26, and a lower channel 28. As known to those skilled in the art, the lower edge 30 of the window opening 18 defines a beltline section 32 of the door 10. The upper channel 24 is mounted substantially above the beltline section 32 of the door 10, the lower channel 28 is mounted substantially below the beltline section 32 of the door 10, and the middle channel 26 is mounted at, or near, the beltline section 32 of the door 10. As used herein, the terms "upper," "lower," "inner," "outer," and other terms of direction, are used with reference to FIG. 1. Laterally along the lower edge 30 of the window opening 18 is a window seal 36 having an inner section 38 in contact with an inner surface 40 of the door 10 window panel 22 and an outer section 42 in contact with an outer surface 44 of the door 10 window panel 22 (FIG. 10).

Figure 3:
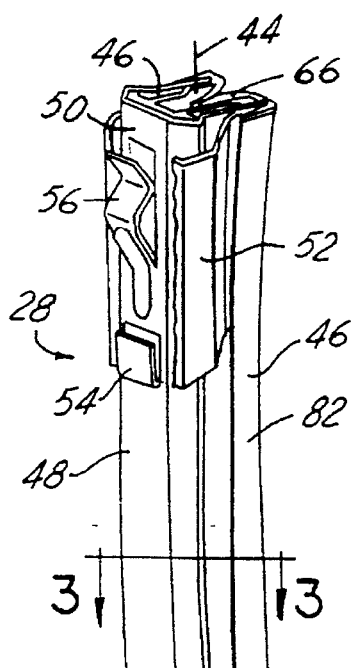
FIG. 3 is a sectional view along line 3—3 of FIG. 2.
Figure 3:
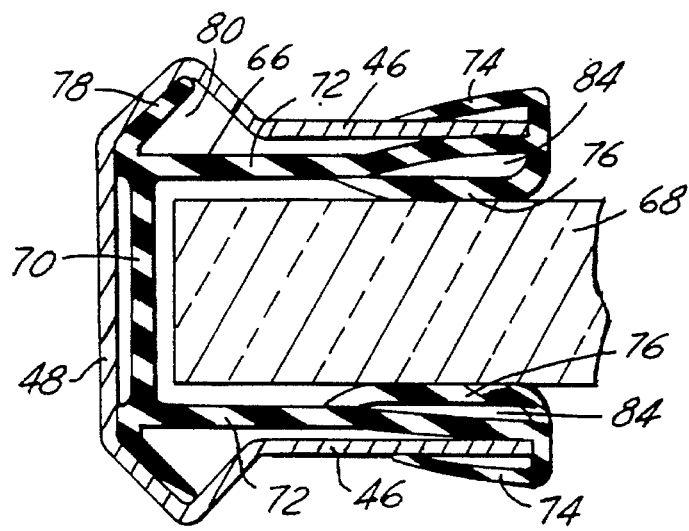
Figure 2:
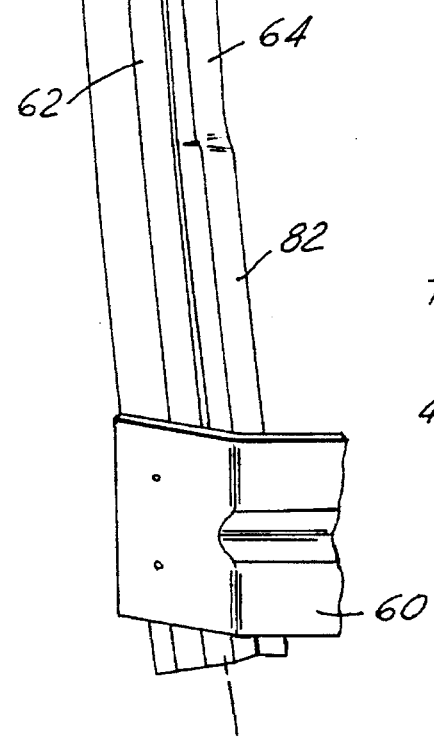
FIG. 2 is a perspective view of a door glass guide according to the present invention showing a crimped portion along a longitudinal axis thereof.
Figure 6:
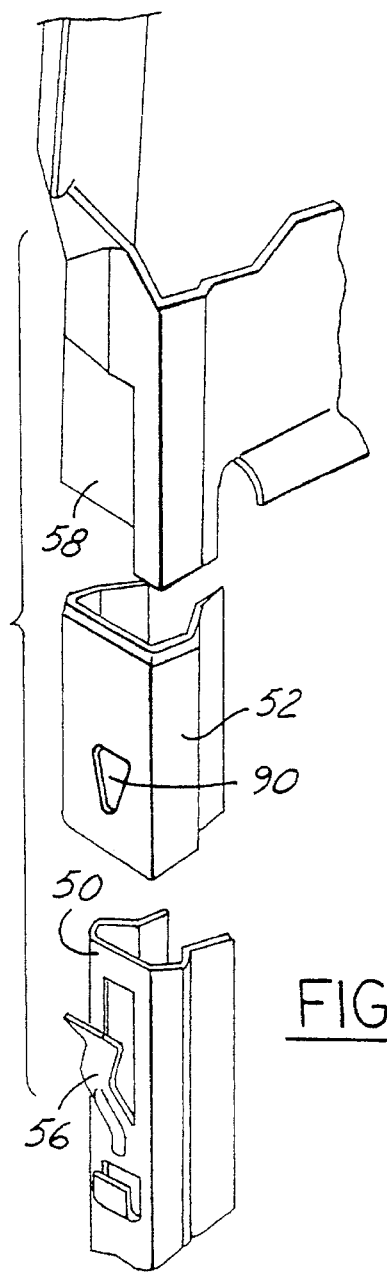
FIG. 6 is an exploded perspective view of the connection shown in FIG. 5.
Figure 7:
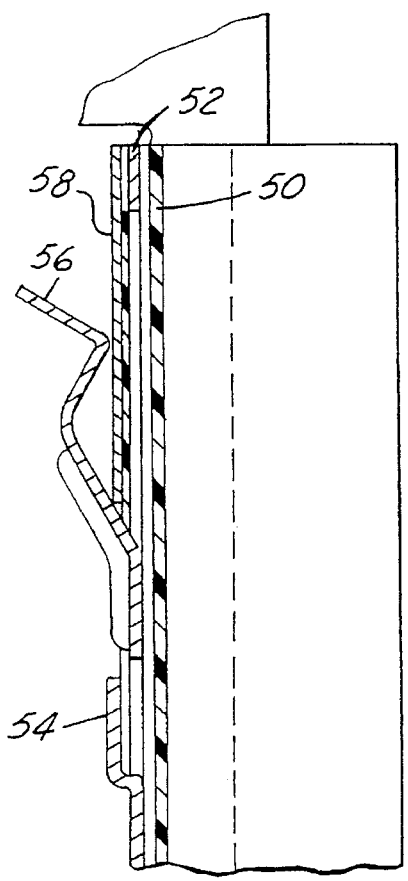
FIG. 7 is a cross-sectional view taken along line 7—7 of FIG. 5.

Turning now to FIG. 2, the lower channel 28 of the glass guide stability assembly according to the present invention is shown having a longitudinal axis 44 and a pair of parallel, spaced-apart sides 46 extending from a bottom section 48. On an outer, upper surface 50 of the lower channel 28 is fitted a sleeve 52 axially limited by a tab 54 extending from the bottom of the lower channel 28 (FIGS. 2, 6, 7). Also extending from the bottom is a flexible tongue member 56 which, as further described below, clampingly receives a surface 58 of the middle channel 26 thereunder. A bracket 60 attaches the lower channel 28 to the door 10 inner panel (FIGS. 1 and 2). The lower channel 28 is preferably made from a rigid material, such as sheet metal or sheet aluminum, and is formed having the sides 46 extending from the bottom section to define a generally U-shaped cross-section, as seen in FIG. 3. Along the longitudinal axis 44 of the lower channel 28 near a center section 62 thereof, the sides 46 are inwardly crimped to form a narrowed width section 64 (FIG. 4) which, as further described below, provides increased lateral stability for the window panel 22, particularly when in a partially opened position.

Figure 4:
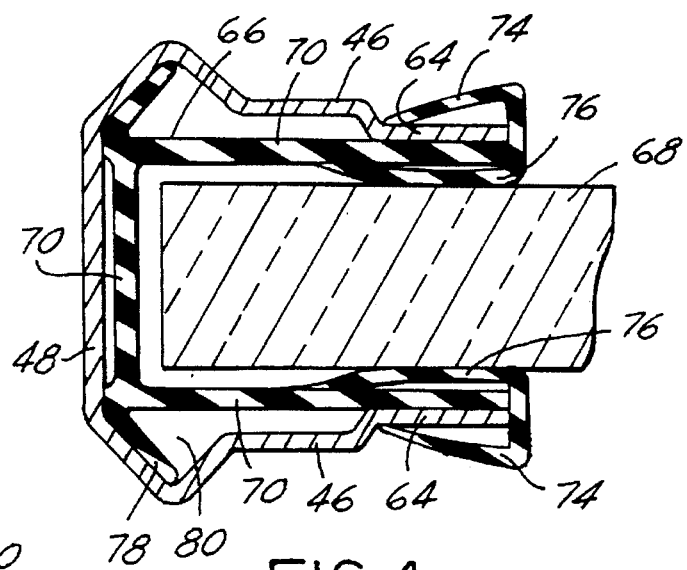
FIG. 4 is a cross-sectional view taken along line 4—4 of FIG. 2.

Referring now to FIGS. 3 and 4, within the lower channel 28 is mounted a deformable glass run 66 which receives an edge 68 of the window panel 22 for sliding movement therethrough. The glass run 66 has a base section 70 and a pair of parallel, spaced-apart walls 72 extending from the base 70 to form a generally U-shaped cross-section. Each wall has a hook member 74 for attaching the wall 70 to a side of the lower channel 28 and a flap member 76 in contact with the edge of the window panel 22 within the glass run 66. The flap members 76 cooperate with the narrowed width section 64 of the lower channel 28 to restrict inboard and outboard movement of the window panel 22, particularly when the open position. Preferably, the glass run 66 has a constant width along the longitudinal axis thereof, and is made of a resilient rubber material.

As best seen in FIG. 4, the flap members 76 contact the edge of the window panel 22 and are laterally maintained in that position by the narrowed width section 64 of the lower channel 28 to restrict inboard and outboard movement of the window panel 22. A pair of flange members 78 extending from the base 70 of the glass run 66, angularly spaced from the walls 72 thereof, fit within outwardly extending slots 80 near the bottom of the lower channel 28 to anchor the glass run 66 therein.

The flap members 76 on the walls 72 interact with the edge of the glass panel to cushion lateral movement of the panel within the glass run 66 (FIGS. 3–4). In the uncrimped sections 82 of the lower channel 28, the flap members 76 are separated by a space 84 from the walls 72 of the glass run 66 which allows lateral movement therein as the flap members 76 can flex to absorb window panel 22 movement. In the narrowed width section 64 of the lower channel 28, however, the walls 72 are pressed closer to the flap members 76, thus decreasing the space therebetween, which in effect limits lateral movement of the edge of the window panel 22 in that section.

Figure 5:
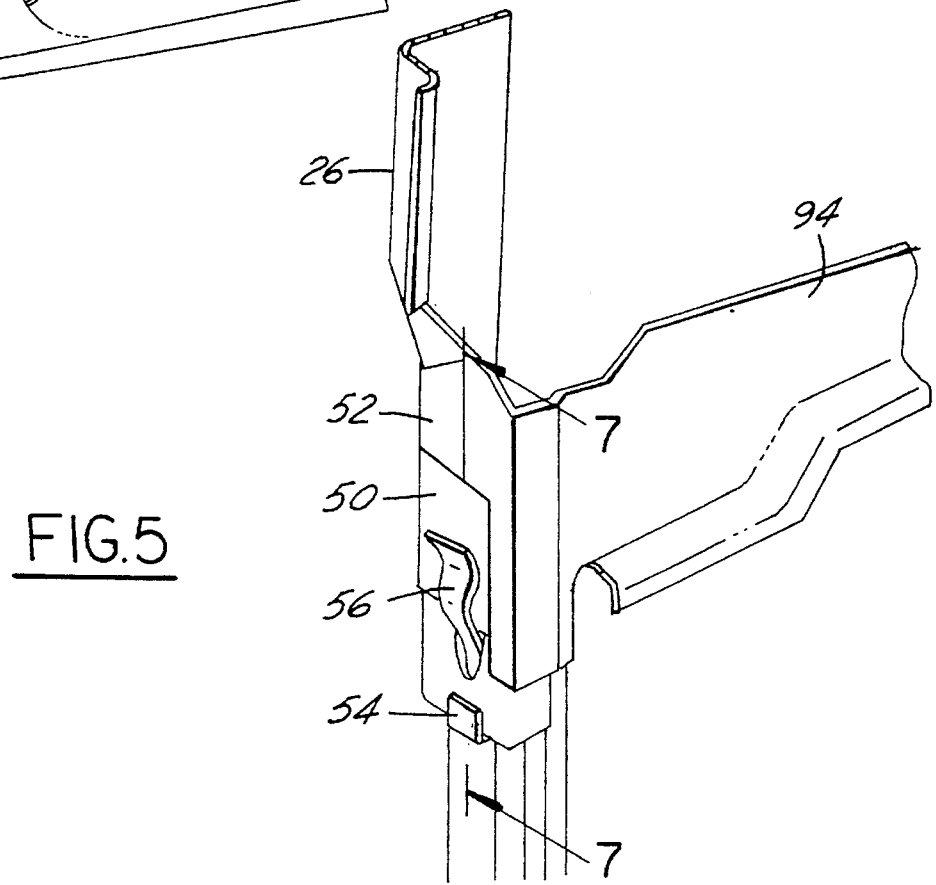
FIG. 5 is a perspective view of a section of a door glass guide according to the present invention showing a spacer for laterally stabilizing movement of the glass guide with respect to a metal glass guide channel.

Further stability of the window panel 22 is achieved through use of a sleeve 52 between the middle channel 26 and the lower channel 28 (FIGS. 5–7). For manufacturing reasons, it is advantageous to have separate channel sections of the window guide to advantageously permit ease of assembly, yet provide a laterally stable guide for the window panel 22. The sleeve 52 is inserted over an outer, upper section 88 of the lower channel 28 with the tongue member 56 inserted through an aperture 90. A mating surface 92 of the middle channel 26 slides beneath the tongue member 56 and is clampingly held in abutting relationship with the sleeve 52. The sleeve 52, in turn is held in abutting relationship with the outer, upper surface of the lower channel 28 to form a laterally stabilized joint for the window guide (FIG. 7).

An extension member 94 on the middle channel 26 fixes to the door 10 inner panel 16 at the beltline section 32 of the door 10 (FIG. 7). The extension member 94 provides additional stability for the window guide 20 and operates in conjunction with the sleeve 52 to limit lateral movement of the window panel 22. Preferably, the middle channel 26 is made from a light metal material, such as aluminum.

Figure 8:
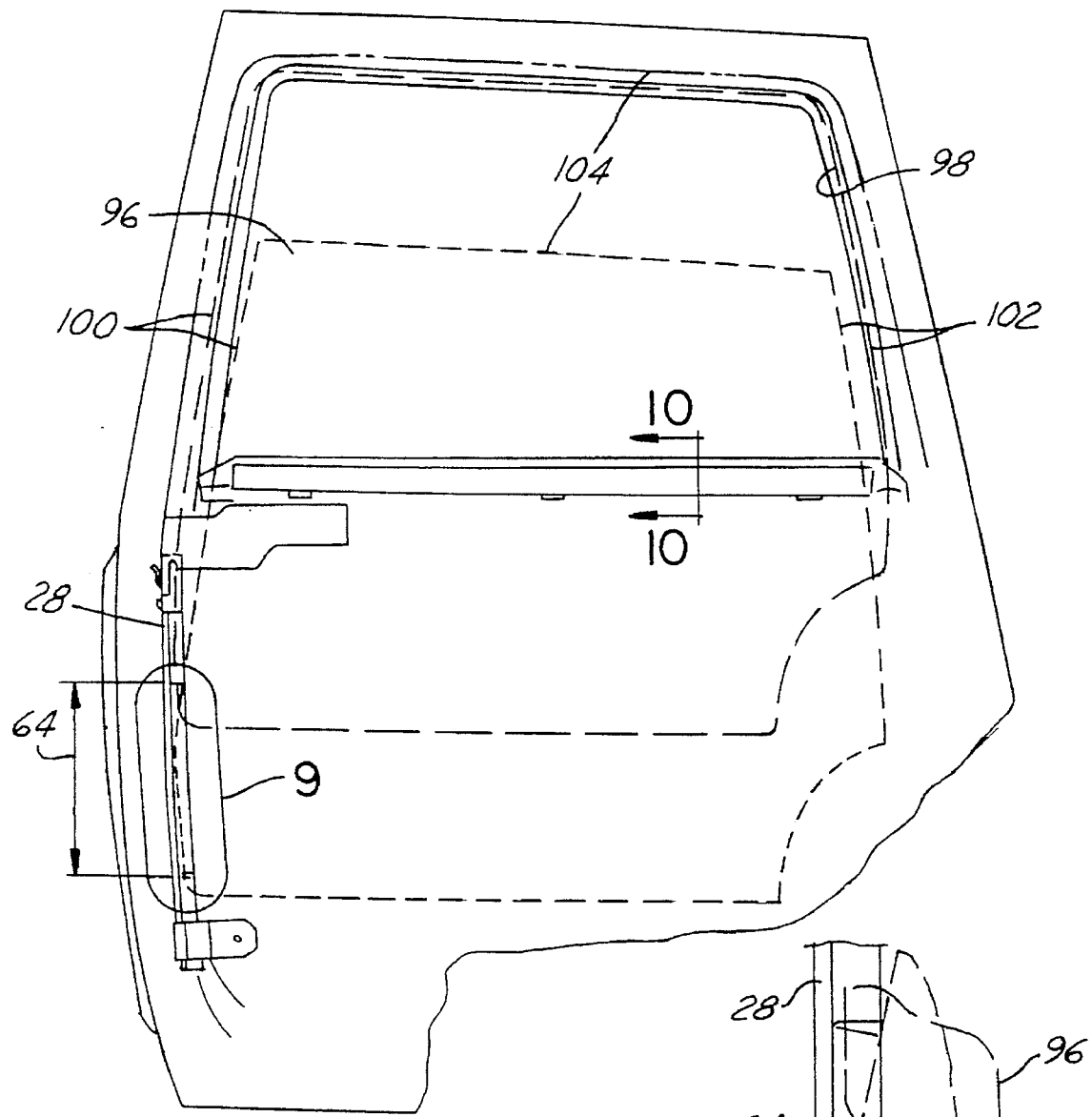
FIG. 8 is a schematic side view of a vehicle door showing a door glass panel in the closed and open positions.
Figure 9:
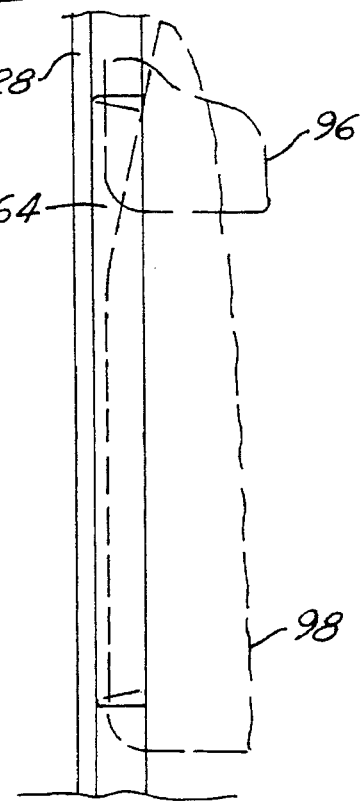
FIG. 9 is an enlarged drawing of a portion of FIG. 8 showing the relative position of the door glass window within the narrowed section of the door glass guide according to the present invention.

Referring now to FIG. 8, a window panel 22 mounted in a window guide 20 according to the present invention is shown in both the partially opened position 96 and the closed position. In the closed position, the window panel 22 engages a window guide 20 on the forward edge 100, the rearward edge 102, and the top edge 104 of the window panel 22. Only a small section of the rearward edge 102 of the window panel 22 is located in the narrowed width section 64 of the lower channel 28, as a result. However, the top edge 104 and forward edge 100 of the window panel 22 are not engaged with a window guide 20 when in the partially opened position, thereby subjecting it to inboard and outboard movement as a result of vehicle motion induced pressure variations. As seen in FIG. 9, a substantial section of the rearward edge 102 of the window panel 22 engages the narrowed width section 64 of the lower channel 28 to stabilize the window panel 22 when in the partially opened position.

Figure 11:
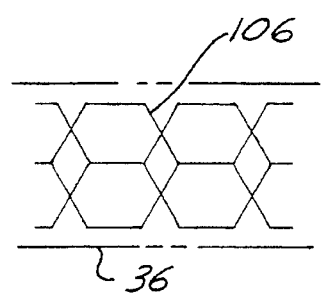
FIG. 11 is a cross-sectional view taken along line 11—11 of FIG. 10.

Further stabilization of the window panel 22 is accomplished by providing reinforced window seals 36 along the beltline section 32 of both the inner panel 16 and the outer panel 14 to contact an inboard surface and an outboard surface of the window panel 22, respectively (FIG. 10). The seals preferably have a wire mesh 106 or chicken wire embedded therein to provide the additional stability (FIG. 11).

Although the preferred embodiment of the present invention has been disclosed, various changes and modifications may be made without departing from the scope of the invention as set forth in the appended claims.

We claim:

1. In an automotive vehicle having a window with a window panel reciprocable between an open position and a closed position, a window panel guide comprising:

an upper channel mounted substantially above a beltline portion of said window;

a lower channel mounted substantially below the beltline portion of said window, said lower channel having width varying means for stabilizing lateral movement of said window panel when in the open position;

window run means situated in said lower channel for slidably directing said window panel through said lower channel;

attachment means on an upper section of said lower channel for attachment with said upper channel; and spacer means disposed between the upper section of said lower channel and said upper channel to limit relative lateral movement therebetween.

2. A window panel guide as in claim 1 wherein said window run means comprises a constant width deformable glass run situated within said lower channel.

3. A window panel guide as in claim 2 wherein said attachment means comprises a flexible tongue member extending from a bottom portion of said lower channel to clampingly receive a surface of said upper channel thereunder.

4. A window panel guide as in claim 3 wherein said spacer means comprises a sleeve fitted over the outer surface of said lower channel.

5. A window panel guide as in claim 2 wherein said glass run is made from a resilient rubber material.

6. A window panel guide as in claim 1 wherein said width varying means comprises at least one longitudinally narrowed width section which inwardly deforms the walls of said window run to restrict inboard and outboard movement of said window panel.

7. In an automotive vehicle door having a reciprocating window panel movable between a closed position obstructing a window opening and an open position to at least partially unobstruct said opening, a window panel guide comprising:

an upper channel mounted substantially above a beltline portion of said door;

a middle channel joined to said upper channel proximate said beltline portion and connected to an inner panel of said door;

a lower channel mounted substantially below the beltline portion of said door with a constant width deformable glass run therein, said lower channel having at least one narrowed width section which inwardly deforms the walls of said glass run to restrict inboard and outboard movement of said window panel;

attachment means on an upper section of said lower channel for attaching said middle channel thereto; and spacer means laterally disposed between the upper section of said lower channel and said middle channel to limit relative lateral movement therebetween.

8. A window panel guide as in claim 7 wherein said lower channel comprises a generally U-shaped construction having a glass run situated therein for cushioning sliding movement of an edge of said window panel within said lower channel and for cushioning lateral movement of said window panel edge with respect to said lower channel.

9. A window panel guide as in claim 7 wherein said glass run has a base, a pair of parallel spaced apart walls extending from the base defining a generally U-shaped cross-section, and a pair of flap members extending from each wall toward the other of said pair of walls, said flap members contacting said window panel along an edge thereof within said lower channel for guiding sliding movement therethrough and for cushioning lateral movement of said window panel edge with respect to said lower channel.

10. A window panel guide as in claim 7 wherein said glass run is made from a resilient rubber material.

11. In an automotive vehicle door having a reciprocating window panel movable between a closed position and an open position to alternately obstruct and unobstruct a window opening, a lower edge of the window opening defining a beltline section of the door, a window panel stabilizing assembly comprising:

(1) an upper channel mounted substantially above the beltline portion of said door;

(2) a middle channel joined to said upper channel proximate the beltline portion and connected to an inner panel of said door;

(3) a rigid lower channel mounted substantially below the beltline portion of said door with an edge of the window panel slidably disposed therein, the lower channel having:
(a) a bottom section;
(b) a pair of parallel spaced apart sides extending from the bottom section defining a generally U-shaped cross-section; and
(c) a narrowed width section wherein the sides are inwardly crimped along a longitudinal axis of the lower channel;

(4) a constant width deformable glass run mounted within the lower channel and having:
(a) a base section;
(b) a pair of parallel spaced apart walls extending from the base to form a generally U-shaped cross-section, each wall having:
(i) a hook member for attaching the wall to a side of the lower channel; and
(ii) a flap member in contact with the edge of the window panel within the lower channel cooperating with the narrowed width section to restrict inboard and outboard movement of said window panel when in the open position;

(5) a flexible tongue member extending from a bottom portion of said lower channel to clampingly receive a surface of the middle channel thereunder;

(6) a sleeve fitted over an outer, upper surface of said lower channel laterally disposed between said upper section and said middle channel to limit relative lateral movement therebetween; and (7) a reinforced window seal along the beltline section of the door.

12. A window panel stabilizing assembly according to claim 11 wherein the window seal is reinforced with a wire mesh.

* * * * *